INVENTOR.
CHARLES L. CLIFTON
BY John R. Walker, III
Attorney

Nov. 2, 1971

C. L. CLIFTON 3,616,540

MACHINE FOR SCRIBING A TAPE TEMPLATE

Filed Jan. 2, 1970

INVENTOR.
CHARLES L. CLIFTON
BY John R. Walker, III
Attorney

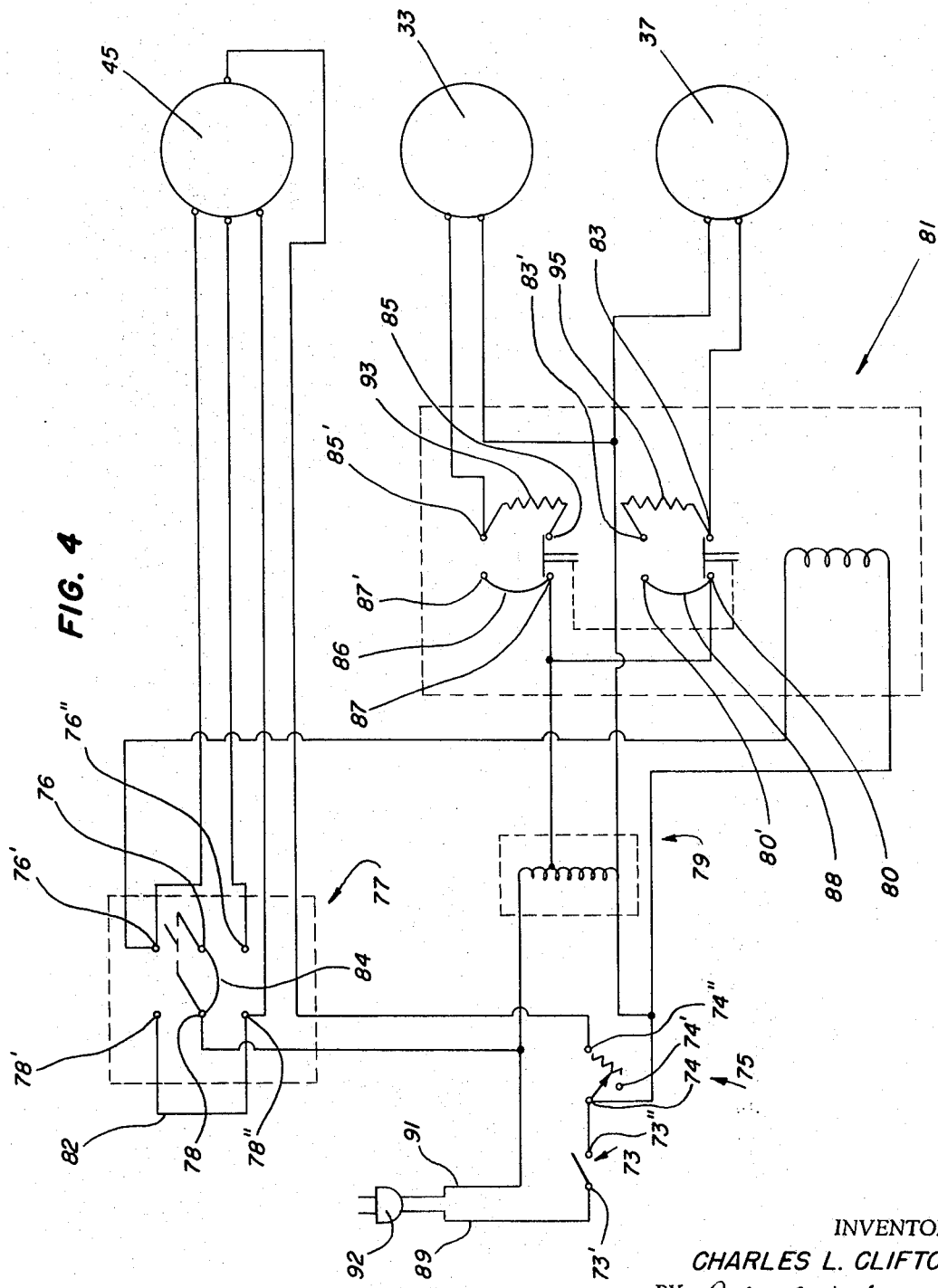

3,616,540
MACHINE FOR SCRIBING A TAPE TEMPLATE
Charles L. Clifton, 1906 W. 34th,
Pine Bluff, Ark. 71601
Filed Jan. 2, 1970, Ser. No. 193
Int. Cl. B43l 13/02
U.S. Cl. 33—76 R   10 Claims

ABSTRACT OF THE DISCLOSURE

A machine to be used for scribing a tape template which is used to simplify laying out the framework for wall construction. The machine includes a table-like structure having an electric motor driven platen which carries the tape, to be scribed, across the table, a pair of electric motor-driven tape take-up reels, a rotary measuring instrument, rough opening indicators which are used in conjunction with a multi-sided locater bar, a center finder template and switches for activating the electric motors.

BACKGROUND OF THE INVENTION

(1) Field of the invention

This invention relates to a machine which facilitates scribing a tape template for ultimate use in the frame construction of building walls, etc.

(2) Description of the prior art

In the building art, particularly private dwellings of the frame construction type, an architect designs the building and provides detailed drawings thereof to the workmen who are known by their trade, e.g., as carpenters. This procedure has effectively prevailed for centuries and is certainly apropos today. However, the spiraling skilled labor costs have provoked many innovations in the building trade.

It has been recognized for many years that the method whereby carpenters, working directly from the architect's drawings, cutting and fitting pieces together at the building site is too costly and time-consuming. One such lumber piece, perhaps the most widely used, is commonly referred to as a 2 x 4, connotating 2″ x 4″. These pieces are used more prevalently in the framework construction, or as is commonly referred to as roughing work. Rough openings must be precisely located along a wall for windows, interior and exterior doors. Most architects show dimensions on their drawings as from any given starting point to the center of these openings. However, the carpenter must convert this data to precisely positioned marks representing the outermost edges of the rough opening on the top and bottom horizontal frame members commonly referred to as plates. Additionally, it is often necessary for the carpenter to locate the center of the 2 x 4 lumber pieces, e.g., locating a T-member for an intersecting interior wall.

All of this converting center location to outer edge lines and locating centers of 2 x 4, as an example, actually measures 1½″ x 3 9/16″. According, the center of the less dimension would be ¾″ from the edge and for the larger dimension, would be 1 25/32″ from the edge. The carpenter, being a highly skilled individual, experiences little difficulty in manipulating these fractions; however, it nonetheless is time-consuming and much more desirable to engage a lesser trained, lower skilled individual to accomplish this layout.

One of the innovations alluded to above involves using an expendable template, disclosed in the Leary Pat. No. 2,187,087 comprising a roll of paper tape having indicia preprinted thereon corresponding to the usual 16″ center to center spacing or uniform indicia of any suitable dimension. Additionally, the Leary patent teaches the use of a supplemental template consisting of two identical tape members having indicia superimposed thereon in reverse relation and is used to indicate the exact location of the window studs, and with the same indicia coinciding the template will denote an opening of corresponding width. The advantage in practicing the Leary patent is the intermediate studs are readily located because of the uniformly placed 16″ indicia on the template and the width of the opening can readily be determined after the center of the opening has been located. However, positioning the intermediate studs is readily a mundane task requiring little skill since a jig in the form of a piece of lumber, the length of which represents the open space between two adjacent studs can be used to uniformly locate the intermediate stud. Additionally, locating the center point for windows and doors, etc., still requires a highly skilled carpenter or the like to relate the dimensions from the architectural drawings establishing a center line on the primary template thereby providing a location for utilizing the supplemental template of the Leary patent.

Another innovation alluded to above involves prefabricating buildings in sections in an assembly line environment utilizing a minimum of skilled workers. This technique still requires the employment of a highly skilled individual to relate from the architectural drawings the precise locations of sub-assemblies even if the Leary Patent 2,187,087 were to be practiced.

To my knowledge, no machine exists that is capable of accomplishing the task or solving the problem of scribing a template which may be used in laying out a wall having random spaced openings and also having random width openings for windows, doors, etc.

SUMMARY OF THE INVENTION

In attempting to obviate the above-mentioned and related problems, I first set out to develop an improved template which would have indicia thereon that, when used in an assembly line for prefabricating walls or the like, could be used by unskilled workmen to completely assemble a section of wall. It became immediately apparent that laying out the indicia on this template required the empolyment of a highly skilled individual and required substantially as much of his time to accomplish the layout on the paper template as it would to layout the openings, etc., on the lumber pieces. Accordingly, this offered no significant advantage other than the tape template could be reproduced in the event more than one like structure was to be built.

The present invention is directed toward providing a machine which can be operated by one person who is not necessarily skilled in the art of carpentry, i.e., a draftsman or the like, but may effectively accomplish the technical task of laying out and scribing indicia on an elongated flexible template such as paper tape or the like. This indicia represents precise locations of sub-assemblies, i.e., door openings, window openings and T-intersections for wall junctions, etc. The completed template may be used as a master copy to reproduce a plurality of additional copies, since a template is expended in the buildup of one unit. The machine of the present invention eliminates the need for a carpenter or the like to accomplish the layout since the machine incorporates mechanical features which accomplish the calculating and compensating. In short, the machine does all the mathematical manipulations accurately and expeditiously and reduces the possibility of human error.

The machine includes a reversible electric motor-driven platen which carries the elongated flexible template, such as paper tape or the like, across a horizontal rectangular-shaped table-like surface. The tape reels are supported one at each end of the table-like structure by a pair of electric motors which either take up the slack tape or pay out the tape depending upon the direction of rotation. The tape is sandwiched between the platen and a measuring wheel which function with the counter to make up a rotary measuring instrument. An important feature of this machine is the center finder template which: (1) provides a reference point for positioning various subassembly indicia on the tape; (2) is the exact center of the rough opening indicator, yet to be discussed; (3) is the normal starting point of most wall panels; (4) is the point from which the rotary measuring instrument is calibrated; (5) is the transition identifier from the architect's dimension on the architectural plan to the paper tape template.

The center finder template, being transparent plastic or the like and having a rectangular shape is removably attached at the one end to the horizontal surface of the table-like structure. The other end extends substantially to the front edge of the table-like structure and the paper tape template is slidably guided beneath a portion thereof. The portion overlaying the paper tape template has meaningful dimension to the outer edges and a plurality of elongated apertures perpendicularly disposed to the longitudinal axis of the paper tape template. The apertures and the outer edges are used as a guide in placing scribe marks or indicia at precise points along the paper tape template. The machine includes a plurality of center finder templates, each having width and aperture openings corresponding to a particular type of construction, e.g., one template for a nominal 4" wall and a separate template for a nominal 6" wall, etc., and are readily interchangeable.

Another feature of this invention is a pair of rough opening indicators which are removably attached to a rack and spur gear arrangement at the one end. The other end extends substantially to the front edge of the table-like structure with a portion thereof overlaying the paper tape template. The overlaying portions each have at least one elongated aperture and a meaningful dimension to the width thereof which are used as a guide in placing scribe marks or indicia on the paper tape template. As the nomenclature implies, the center finder template locates the center of sub-assemblies, and the rough opening indicators locate the outermost edges of the openings for the sub-assemblies. Accordingly, even though the rough opening indicators are attached to the rack and spur gear assembly and have infinite settings, the distance from one rough opening indicator to the centermost aperture of the center finder template always is equal the distance from the other rough opening indicator to the centermost aperture in the center finder template.

Still another feature of the machine is the locater bar which includes an elongated multi-sided rotatable bar. The locater bar is used in conjunction with the rough opening indicators, more particularly, it is used as a guide for positioning the rough opening indicator. One of the rough opening indicators extends substantially to the rearward edge of the horizontal surface of the table-like structure and has attached at the rearwardmost portion thereof a vertically disposed elongated pointer which extends upward perpendicular from the horizontal surface of the table-like structure to the multi-sided locater bar.

Positioning of the rough opening indicators is accomplished by the operator first dialing the appropriate scale on the bar, whether it be aluminum windows, exterior doors, interior doors, etc., and then he rotates the adjusting knob for the rough opening indicators until the pointer is aligned with the particular window or doors being laid out. It should be understood that width of rough openings for like size window panes framed in aluminum differs from the rough openings of like sized windows having wood frames so different scales are provided on the locater bar. Each surface of the locater bar accommodates a separate and distinct scale which corresponds to a particular type of sub-assembly. Additionally, each scale is removable which provides for adapting the machine to all sub-assemblies of various sizes and types of construction presently being manufactured as well as those not yet conceived.

In using the machine of the present invention, wall layout for frame construction can be more easily and quickly effected by substituting paper or other lightweight material for the top and bottom plates during the layout. The paper is later fastened to the wood members by means of adhesive or if a requirement exists for prefabricating a plurality of like units, the paper template is used as a master copy to reproduce as many copies as needed. The paper template tape is applied simultaneously to the bottom and top plates, the plates being placed adjacent one with the other and on edge. The tape is then cut or severed at a perforated center mark before fabrication.

A slight modification to the architect's drawings prior to operating the machine of the present invention is considered apropos to most efficiently and expeditiously gain the intended advantages. The modification comprises picking a starting point, preferably a corner of two adjoining walls, and marking the drawing designating the distance to the center of the first sub-assembly within the wall, then adding the distance to the center of the next sub-assembly, then the next, etc., until that one wall is completed. The remaining exterior walls and the interior walls are each designated with a beginning point on the architectural drawing and the distances are cumulatively carried through to a corner or intersection. Any wall having length in its entirety considered to be unwieldy as such is divided into sections or panels at specified maximum intervals with variations to avoid ending any one section in a manner that would create interference with a sub assembly.

The architectural drawings are now suitable to be used in providing the input data for the machine of the present invention. This machine is not limited to providing only a read-out for locating sub-assemblies and the like, since any pertinent information desired to be conveyed to the fabricator, as well as the framer, can be scribed upon the tape, e.g., wall covering, flashing and heating ductwork. The advantages, in addition to those already made evident, are:

(1) The laying out of the tape template can be scheduled well in advance of its anticipated use which precludes costly work stoppages at the assembly line and/or the possibility of the layout man being idle or ineffectively utilized.

(2) Copies of the tape template can be obtained by reproducing the original, thereby realizing a great savings in man hours when fabricating a plurality of like units. It should be understood that a unit does not necessarily encompass an entire dwelling or the like, but may be a small segment thereof, e.g., one section of an interior or exterior wall, etc.

(3) Alternate walls can be laid out quickly and inexpensively by changing a minimum number of panels. This provides a wide variety of options at a minimum cost.

(4) A semi-skilled person can easily and quickly learn how to operate this machine which considerably reduces the cost normally associated with layout work. Also, since this machine virtually eliminates all manual mathematical calculations, it can be said that it virtually eliminates all the errors normally found in layout work.

BRIEF DESCRIPTION OF THE DRAWINGS

FIG. 4 is a schematic showing the various electrical components and the electrical hookup thereof.

DESCRIPTION OF THE PREFERRED EMBODIMENT

Figure 1:
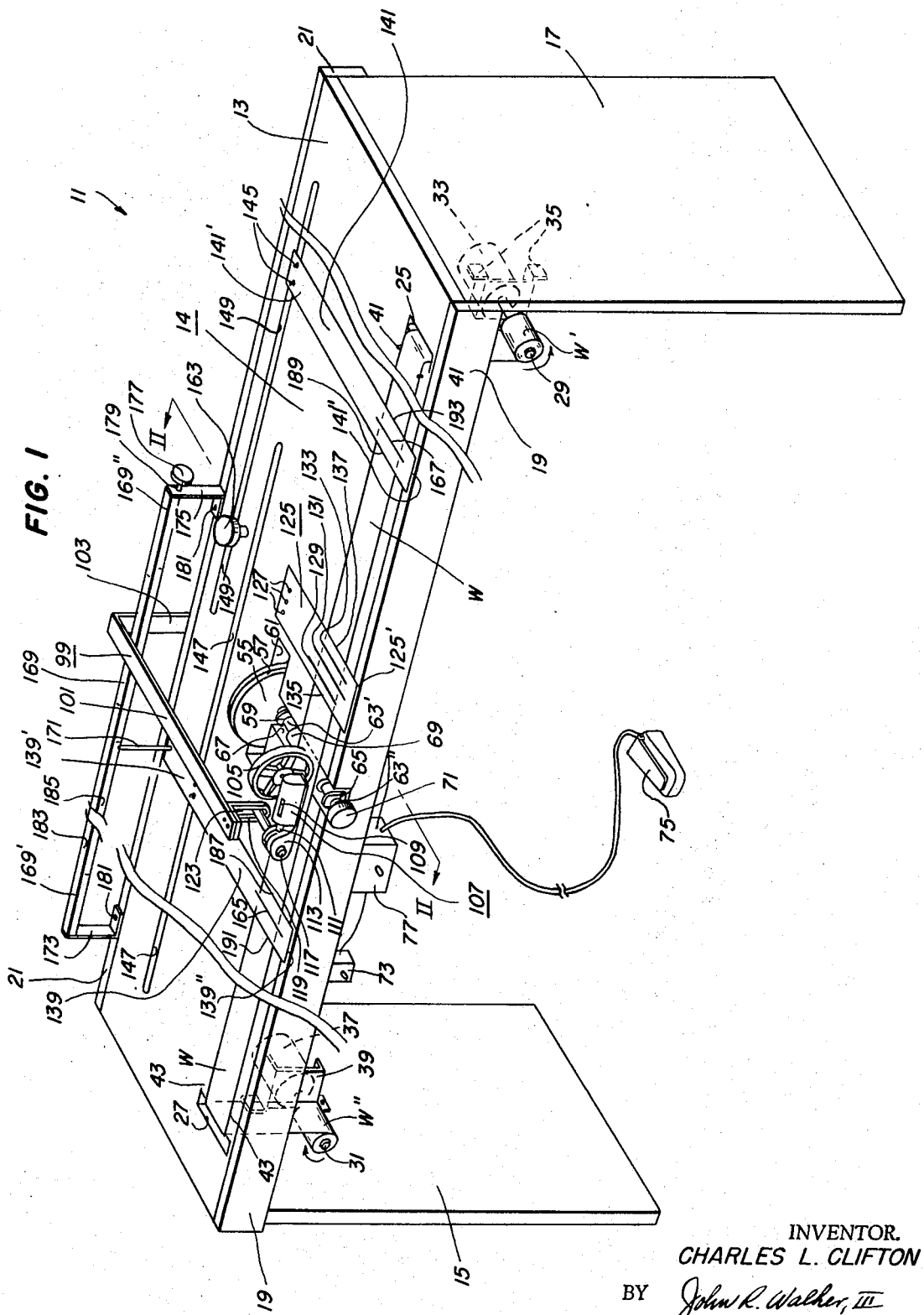
FIG. 1 is a perspective view of the machine of the present invention.

The machine 11 of the present invention having a base console-like structure 14, formed from metal or the like, which includes an elongated rectangular-shaped horizontal member 13 supported at a suitable working height by a pair of vertically disposed parallel spaced apart end pieces 15, 17. The end pieces 15, 17 are fixedly attached to the horizontal member 13 at the upper ends and extend downwardly to the lower ends which rest on the floor or the like. A pair of longitudinal vertically disposed parallel spaced apart front and back lateral support members 19, 21 respectively provide lateral support for the console 14. The machine 11 is intended to be operated by one semi-skilled person, e.g., a draftsman or the like, who is engaged in the task of preparing or laying out indicia on an elongated weblike flexible template strip W, such as paper tape or the like. The template W is later used in a fabricating process which involves prefabricating private dwellings or the like of the frame construction type in an assembly line environment. More particularly, in the use thereof the template W is attached as by adhesive or the like to the edge portion of two adjacent elongated lumber pieces (not shown) which will later be used as plates, one piece forming the bottom member or toeplate and the other piece forming the top plate of a frame wall. The template W may have a perforated centerline, not shown, running the length thereof to facilitate separating the two plates after the adhesive sets or a sharp instrument could simply be used to slit the template W leaving substantially one-half on the toeplate and the other half on the top plate, both portions having identical indicia to be used in aligning the studs or liners which form the vertical framing members of openings for sub-assemblies, i.e., T, door opening or window opening. The template W would not have indicia markings for nonvariable studs since these are preferably located by jigs on the assembly line. The important utilization of the template W is in locating openings, corners, and wall intersections.

From FIG. 1 of the drawings, it may be seen that the template W overlays a portion of the horizontal surface 13 adjacent the front member 19 and extends from one aperture 25 in member 13 adjacent the end piece 17 to another aperture 27 in member 13 adjacent the end piece 15. The elongated template W being in a rolled configuration at one end as at W' is preferably encircled around a mounting spindle 29 adjacent the right end piece 17 and extends substantially vertically upwards and through the elongated aperture 25 having a curved upper edge, thence horizontally leftward to and through the aperture 27 adjacent the left end piece 15 also having an upper edge suitably curved, thence vertically downward to a second mounting spindle 31 where the template W accumulates in a roll W" as the operator progresses in the task of laying out indicia thereon. The spindles 29, 31 constitute extensions of rotatable electric driven motor shafts whereby a motor 33 being attached to the end piece 17 with suitable support structure 35 is designed to normally rotate counterclockwise as shown by the arrow (FIG. 1) and a motor 37 is attached to the end piece 15 by suitable support structure 39 and is designed to normally rotate clockwise as shown by the arrow. It should be understood that the motors 33, 37 deliver very little torque, their main purpose being to take up the slack in the template W and/or allow for the paying out of the template W in a controlled fashion, i.e., keeping the template W taut in a manner yet to be described. It should be further understood that the motors 33, 37 are supplied with a reduced voltage and are a type known as shaded pole motors so they may be stalled or slowed down without damage thereto, for purposes which will be apparent after the remaining structure has been fully disclosed. A pair of guidepins 41, comprising finishing nails or the like, adjacent the aperture 25 and an identical pair of guidepins 43 adjacent the aperture 27 guide the constrained template W over a prescribed portion of the upper surface of member 13.

Figure 2:
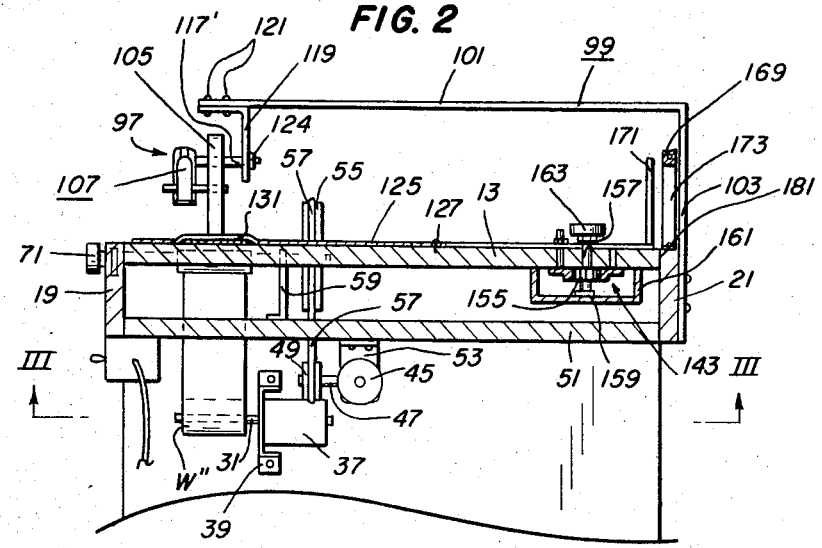
FIG. 2 is a sectional view taken as on the line II—II of FIG. 1.
Figure 3:
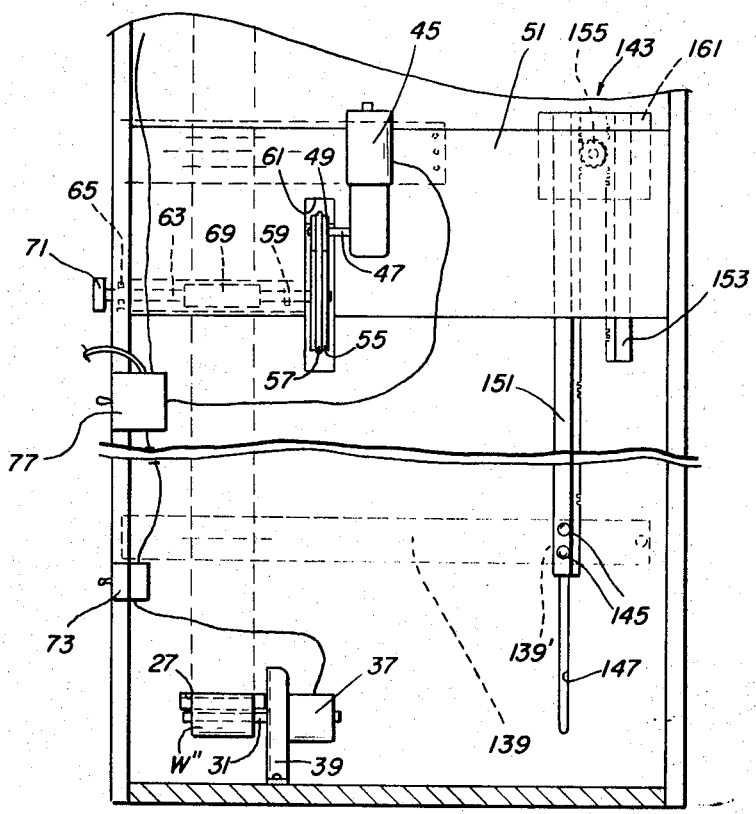
FIG. 3 is a sectional view taken as on line III—III of FIG. 2.

A reversible variable speed electric gear motor 45, as best viewed in FIGS. 2, 3, rotatably drives a shaft 47 which is keyed to a pulley 49. The motor 45 is attached to a transversal support member 51, which is positioned intermediate the front and back support members 19, 21 with the lower surface thereof being flush with the bottom edges of the support members 19, 21, as best viewed in FIGS. 2, 3. The pulley 49 frictionally drives a substantially larger pulley 55 by a round leather belt 57. The pulley 55 is journaled to the transversal support member 51 by a bearing and bracket assembly 59 (FIG. 2) and protrudes substantially halfway through an elongated aperture 61 in the horizontal member 13, as best viewed in FIGS. 1, 3. The pulley 55 is keyed to a shaft 63 which is journaled at the distal end 63' by the bearing and bracket assembly 59 and at the proximal end 63" by a bearing and bracket assembly 65 which is suitably secured to the support member 19. The shaft 63 is recessed into an elongated aperture 67 in the member 13. The apertures 61, 67 meet at right angles, forming a T. An elongated cylindrical drive platen 69, formed of resilient rubber or the like, encircles and is fixedly attached to the shaft 63 intermediate the bearing and bracket assemblies 59, 65 so that each end protrudes beyond the corresponding edge of the template W. The platen 69 has a suitable diameter that will insure a slight parallel spaced apart relationship to a tangent line, not shown but substantially represented by the plane of the template W. The proximal end 63" of the shaft 63 protrudes beyond the outermost surface of the front support member 19 where an adjusting knob 71 is fixedly attached thereto, as with staking pins or the like, not shown.

The motor 45 is connected to an electrical source, e.g., 115 volts AC, being interposed with a master cutoff switch 73, a foot-operated rheostat 75 and a double-pole double-throw switch 77, as best viewed in FIGS. 1, 4. From FIG. 4 of the drawings, it may be seen that the motor 45 reverses direction of rotation depending on the position of the switch 77 and the speed of the motor 45 is controlled by the degree of depression of the rheostat 75. The switch 73 interrupts the circuit to the motor 45 and the motors 33, 37. An auto-transformer 79 is constantly energized then switch 73 is closed and the output interposed with a double-pole double-throw relay 81 is delivered to the motors 33, 37. The motor 45 rotatably drives the pulley 49 which in turn rotatably drives the pulley 55, by the leather belt 57, and the pulley 55 rotatably drives the journaled shaft 63 which rotatably drives the platen 69 and the adjusting knob 71. The platen 69 carries the template W across the console 14 in a forward direction, preferably from right to left, and in a reverse direction, from left to right, depending upon the position of switch 77, in a manner best understood after the schematic in FIG. 4 has been fully described.

An elongated cable comprising a pair of conductors 89, 91 is attached at the one end to a typical male plug 92 which may be plugged into any convenient wall outlet. Conductor 89 is attached at the other end of a contact 73' of the switch 73 and the other end of conductor 91 joins a junction which leads to the transformer 79 and the double-pole double-throw switch 77. Closing contacts 73', 73" of switch 73 energizes the transformer 79 and sends voltage to the contact 74 of the rheostat 75. The rheostat 75 is spring-biased to an off position whereby contacts 74, 74' are open to contact 74". The normal or forward position for switch 77 is that contact 78 is connected to contact 78" and contact 76 is connected to contact 76". It should be understood that bus-bars 82, 84 connect contacts 78', 78" and 76, 78 respectively. Depressing rheostat 75 causes current to flow from contact 74 through resistance to contact 74" which completes the circuit for the platen driving motor 45. Thus, motor 45 rotates carrying the template W from W' to W". The output of transformer 79 is constantly applied to motors 33, 37 simultaneously. However, in the normal position of switch 77 the double-pole double-throw relay 81 is not energized. The deenergized position of the relay 81 completes the circuit between contacts 87, 85 and contacts 80, 83. A pair of voltage dropping resistors 93, 95 are connected between contacts 85, 85' and 83, 83' respectively. A pair of busbars 86, 88 are connected between contacts 87, 87' and contacts 80, 80' respectively. With relay 81 in a de-energized position, the full output of the transformer 79 is applied to the motor 37 only, however, motor 33 is energized with a reduced voltage, it being interposed with resistor 93. It should be understood that the motor 33 is tending to carry the template W in a reverse direction from left to right and the motor 37 is tending to carry the template W forward or from right to left. The full output of the transformer 79, substantially 90 volts A.C., applied to the motor 37 is sufficient to wind the template W into roll W" on the spindle 31. The motor 33 having a reduced voltage applied thereto causes sufficient drag on the template roll W' so that when the template W is being rapidly played out by the platen 69 and is caused to stop suddenly, the inertia acting on the roll W' causing it to continue paying out template W is counter-acted.

The operator occasionally has reason to reverse the template W, e.g., to verify previously scribed marks and to rewind the completed template W so that the beginning point is the outermost layer on the roll W'. Reversing the direction in which the template W is carried across the console 14 is accomplished by changing the position of the switch 77, closing contacts 78, 78' and contacts 76, 76'. This action, assuming switch 73 and rheostat 75 are closed, sends current through the reverse windings of the motor 45 and simultaneously energizes the relay 81, closing the contacts 85', 87' and contacts 80', 83'. The motor 45 is energized in a reverse direction and the motor 33 is receiving the full output of the transformer 79, however, the motor 37 is energized with a reduced voltage due to the interposed voltage dropping resistor 95. The template W is now being carried across the console from left to right and the motor 33 is winding the template W into a roll W' and the motor 37 is paying out from the roll W" which has sufficient drag to eliminate any backlash due to a sudden stoppage of the motor 45.

A rotary measuring instrument 97 is suspended from the one end of an L-shaped support bracket 99, specifically, from the horizontally disposed portion 101 which extends transversely intermediate the console 14 rearwardly to a vertically disposed portion 103 which extends downwardly and is attached by suitable means to the back member 21. The rotary measuring instrument 97 includes a measuring wheel 105 which rotatably drives a suitable counter 107 of well known construction having an elongated aperture 109 which provides a readout in units of feet and inches, and a reset knob 111 for zeroing the counter 107. A support bracket 115 (FIG. 1) is pivotally mounted at one end on a round shaft 117. A second support bracket 119 (FIG. 2) is fixedly attached as by bolts 121 to the portion 101 of the support bracket 99. The distal end 117' of the shaft 117 having a reduced diameter and threaded portion extends through an elongated aperture 123 and is fixedly attached to the bracket 119 with the shoulder formed by the reduced diameter resting on one side and a nut 124 securely attached at the other side. It should be understood that the measuring instrument 97 may be secured by the shaft 117 to the bracket 119 at variable heights within the limits of the aperture 123. It should further be understood that the weight of the parts (i.e. wheel 105, counter 107 and related parts) on the distal or right end of bracket 115 causes the bracket 115 to be pivotally urged clockwise (as viewed in FIG. 1) so that wheel 105 rides on template W. If desired, supplementary means, as a spring, not shown, may be provided for urging bracket 115 clockwise.

The template W, being sandwiched between the downwardly biased measuring wheel 105 and the motor-driven platen 69 is carried across the console 14, thus causing the measuring wheel 105 to rotate. The diameter of the measuring wheel 105 is such that when one foot of the template W has traveled between the platen 69 and the measuring wheel 105, the figures in the aperture 109 of the counter 107 will register a one foot change.

Although the speed of the motor 45 can be readily controlled with the rheostat 75, the operator can more quickly stop the template W at a precise point by merely gripping the knurled circumferential surface of the adjusting knob 71 as the counter 107 is slowly coming up on the desired reading. A clutching action is achieved by gripping the knob 71 since it is directly connected by the shaft 63 to the pulley 55 which in turn is being rotatably driven by the belt 57 from the smaller diameter pulley 49. Since the diameter of the pulley 49 is much less than that of the pulley 55, it offers less friction to the belt 57, thus the belt 57 slips on the pulley 49.

A rectangular transparent center finder template 125 is removably attached by suitable means as with machine screws 127 inserted through suitably drilled apertures in member 13 of the console 14 with the one end 125' substantially flush with the outermost edge of the front support member 19. There are preferably a plurality of center finder templates 125 each being similar in appearance and identical in function. The plurality of center finder templates 125 are interchangeable, each pertaining to a specific size framing. Accordingly, one such template 125 pertaining to a nominal 4" frame will be disclosed in detail and since the difference in the other templates 125 are in dimensions only, it should be understood that this disclosure encompasses any wall regardless of its dimensions.

The template 125 includes a plurality of elongated apertures 129, 131, 133 adjacent the end 125', the longitudinal axes of which are parallel one with the other and parallel with the longitudinal axes of the template 125. The template 125 has two edges 135, 137 running parallel with the apertures 129, 131, 133. It should be understood that the template 125 may have additional apertures which pertain to other thickness walls, wall covering material, heating ducts, and flashing, etc., that have purposely been deleted for purposes of clarity. The center aperture 131 is exactly centered on the template 125 and is the reference point for each operation accomplished with the machine 11. It is the exact center of the rough opening indicators, yet to be described; it is the normal starting point of most wall panels; it is the point from which the rotary measuring instrument 97 is calibrated; and it is to be identified with the architect's dimension marks.

In disclosing the operation of the template 125, the simplest form will be maintained, i.e., that used when only 2 x 4 members are indicated in the walls. The template 125 measures 7⅛" from the edge 135 to the edge 137 or stated another way, the template 125 measures 3⁹⁄₁₆" from the aperture 131 to the edge 137. Since a 2 x 4 is actually 3⁹⁄₁₆" wide, the template 125 is designed accordingly. The aperture 129 is positioned precisely in the midle of the space between the edge 137 and the aperture 131. It should be understood that the template W is beneath the template 125 and that the apertures 129, 131, 133 have sufficient length and are positioned such that they extend from one edge of the template W to the other edge and have a width suitably designed to adequately receive a sharp, scribing instrument, such as a ballpoint pen or the like, for making indicia on the template W.

The machine 11 includes a pair of rough opening indicators 139, 141 comprising a rectangular transparent piece of plastic or the like. These indicators are attached at the ends 139', 141' to a rack and spur gear assembly 143, with a pair of bolts-nuts 145 inserted through suitably drilled apertures. The attaching bolts 145 for the indicator 139 extend through an elongated aperture 147, the longitudinal axis of which runs parallel with the longitudinal axes of the console 14 and is positioned substantially as shown in FIG. 1. The attaching bolts 145 for the indicator 141 extend through an aperture 149 the longitudinal axis of which is parallel to the longitudinal axes of aperture 147 and is positioned rearward of aperture 147 adjacent the support member 21 in a manner substantially as shown in FIG. 1. Referring now to FIGS. 2, 3, a rack gear 151 supports the indicator 139 and a rack gear 153 supports the indicator 141. A spur gear 155 engages the rack gears 151, 153 and is hand rotatable by a shaft 157 extending through a suitable aperture in the member 13 of the console 14. The shaft 157 extends downwardly to a bearing 159 positioned in a bearing support bracket 161 having structure substantially as shown in FIGS. 2, 3. The upper end of the shaft 157 which protrudes through the member 13 of the console 14 receives a serrated adjusting knob 163 which is removably attached as by setscrew or the like. The adjusting knob 163 may be freely rotated by hand and the spur gear 155 rotates accordingly, moving the rack gears 151, 153 laterally in equal and opposite directions. The aperture 165 of the indicator 139, being moved laterally by the adjusting knob 163, is always the same distance from the center aperture 131 of the center finder template 125 as is the aperture 167 of the indicator 149. The indicators 139, 141 being attached to the rack and spur gear assembly 143 at the ends 139', 141' respectively extend forward (FIG. 1) and terminate at the ends 139", 141" which are substantially flush with the outermost edge of the front support members 19. The ends 139", 141" of the indicators 139, 141 have at least one elongated aperture 165, 167 respectively having a longitudinal axis parallel with the longitudinal axis of the indicators 139, 141. It should be understood that the indicators 139, 141 overlay the template W and the apertures 165, 167 have sufficient length and are positioned such that they extend from one edge of the template W to the other edge and have width suitably designed to adequately receive a sharp scribing instrument, such as a ballpoint pen or the like, for marking indicia on the template W.

The machine 11 includes an elongated multi-sided hand rotatable locater bar 169 which is used in conjunction with a pointer 171 for positioning the rough opening indicators 139, 141. The locater bar 169 being horizontally disposed at an elevated parallel spaced apart relationship and adjacent to the back member 21 is supported therefrom by a pair of opposing L-brackets 173, 175, formed from suitably bent flat steel or the like. The locater bar 169, being formed of wood or the like and having at least three sides, is pivotally attached at the one end 169' as with a finishing nail through an aperture positioned adjacent the uppermost end of the bracket 173. The other end 169" is fixedly attached to an adjusting knob 177 having a threaded shank portion 179 pivotally extending through an aperture adjacent the uppermost end of the bracket 175. The shank 179 is frictionally threaded into the locater bar 169, accordingly, rotating the adjuting knob 177 effectively rotates the locater bar 169 about its longitudinal axis. The brackets 173, 175 are fixedly attached to the top edge of the back member 21 by suitable means.

The pointer 171 being formed from plastic or the like is fixedly attached as by bonding, to the end 139' of the indicator 139 and extends vertically upward terminating at a height at least equal to the height of the locater bar 169. Rotation of the knob 163 by hand effects lateral movement of the indicators 139, 141 and the pointer 171, being fixedly attached to the indicator 139, is thusly positioned at prescribed points along the locater bar 169. The locater bar 169 includes a plurality of precisely calibrated scales, not shown, each of which is intended to be removably attached to any one of a plurality of surfaces such as 183, 185. Each scale has indicia superimposed thereon to be used as a guide in positioning the indicators 139, 141 which are used to mark the liner, forming the rough openings and the studs next to the liners.

The operator rotates the knob 177 so as to present the appropriate scale on surfaces 183, 185, etc., on the locater bar 169. It should be understood that a separate scale is used for aluminum windows, exterior doors, interior doors, etc., since the distance between liners varies with the type of construction, e.g., the architect may specify a 5' window unit leaving the type of construction optional. One contractor may select windows framed with aluminum, and another may select windows framed with wood. The distance between the liners forming the rough openings, and the stud next to the liners would vary accordingly, so separate scales are provided for attachment to the locater bar 169. Assuming the operator is attempting to locate a 5' aluminum window, he rotates the knob 177 to the "aluminum window" scale. He then rotates the knob 163 aligning the pointer 171 over the 5' mark on the aluminum window scale attached to the locater bar 169. This displaces the inner edges 187, 189 a compensating distance apart, i.e., 5' plus the precalculated linear dimensions of all the required framing. It should be understood that the portions of the indicators 139, 141 which overlay the template W have a width substantially equal to the thickness of two 2 x 4's, i.e. the space from the aperture 165 to either edge 191, 187 is 1½", the actual thickness of a 2 x 4 and likewise, the space from the aperture 167 to either edge 189, 193 is 1½".

After the operator has positioned the pointer 171 as above described, he would make a scribe mark along the edges 187, 189 of the indicators 139, 141 respectively and in the apertures 165, 167 representing a space on the toeplate and top plate to be filled by the liners forming the rough opening. He would also scribe a mark along the edges 191, 193 of the indicators 139, 141 respectively representing a space on the toeplate and top plate to be filled by the studs next to the liners. It should be understood that where single framing is used, the operator uses only the inward opposing edges 187, 189 and the apertures 165, 167 of the indicators 139, 141 and makes a notation to that effect on the template W and in the case of double liners, he places scribe marks along the edges 187, 189, 191, 193 and in the apertures 165, 167 and places a notation on the template W indicating "double liner" and the framer knows to add an extra liner in lieu of the adjacent stud and place a stud next to this second liner.

The machine 11 is operated by placing a roll of template W' on the spindle 29 and threading it up through the aperture 25, thence laterally to and under the indicator 141, the center finder template 125, the measuring wheel 105 and the indicator 139, thence down through the aperture 27 to the spindle 31 winding a portion thereon forming a roll of template W". The switches 73, 77 are placed in the "on," "forward" positions respectively which immediately energizes the motors 33, 37. The motor 37 rotates sufficiently to take up any slack in the template W and having very little torque, having done so, will cease to rotate. The motor 33 being energized with a substantially reduced voltage tends to rotate in a direction shown by the arrow in FIG. 1 maintaining the template W taut, in a manner previously described. There is probably no limit to the number of situations that could be explained. However, the lay-out operation of a portion of an exterior through wall will be described and those persons skilled in the art of prefabrication will be able to adapt this technique accordingly. The wall which will be described as a 2' window unit, the sash etc. will be wooden and the center is 7'9" from the corner edge or beginning of the wall o+oo, a three foot door whose center is 15'7" from the corner and an interior intersecting wall whose center is 19'3" from the corner.

The operator would rotate the knob 177 to the "wood windows" scale, rotate the knob 163 aligning the pointer 171 with the 2' mark on the scale, and place a scribe mark through the aperture 131 of the center finder template 125 which indicates the beginning o+oo feet of the wall. He would then depress the switch 75, energizing the motor 45, which drives the platen 69 which carries the template W across the console 14, causing the rotary measuring instrument 97 to operate, and the counter 107 indicates the lineal feet and inches of template W passing a given point, i.e., aperture 131 of the template 125. As the counter 107 is coming up to 7'9", the operator gradually relaxes the pressure on the switch 75, causing the template W to move at a slower rate and when the counter indicates 7'9", the operator grips the knob 71 firmly, which causes the platen 69 to crease rotating, in a manner previously described, thus the template W ceases to move. It should be understood that, if desired, when the counter indicated approximately but not exactly 7'9", the operator could then remove his foot from switch 75, and adjust precisely to 7'9" by means of the knob 71. The operator now places a scribe mark adjacent the indicators 139, 141, more particularly, along the innermost edges 187, 189, the outer edges 191, 193 and through the apertures 165, 167 respectively. The space between the apertures 165, 167 indicates the length of the header and also indicates the locations on the toe and top plates for the two liners. The space from the edge 191 to the aperture 165 represents the location of the adjacent stud closest to the corner of the wall or the beginning o+oo and the space between the aperture 167 and the edge 193 represents the location of the other adjacent stud.

The operator now rotates the knob 177 to the scale having "exterior doors" thereon and rotates the knob 163 aligning the pointer 171 with the 3' mark. He then depresses the switch 75 which moves the template W forward as previously described and when the counter 107 is coming up on 15'7", he again relaxes the pressure on the switch 75, and at the moment the counter 107 indicates 15'7" he firmly grips the knob 71, stopping the template W as previously described, or adjusts to the precise position by moving knob 71 one way or the other. The operator again places scribe marks adjacent the rough opening indicators 139, 141, more particularly, along the edges 187, 189, 191, 193 and apertures 165, 167. Here again, the space between the apertures 165, 167 represents the length of the header and the positions for the liners. The space between the edge 191 and the aperture 165 represents the location of the adjacent stud closest to the corner of the wall or the beginning o+oo and the space between the aperture 167 and the edge 193 represents the location of the other adjacent stud.

The operator now ignores the knobs 177, 163 since they pertain to rough openings only and depresses the switch 75 which drives the template W and causes the counter to indicate the linear feet of template W displaced. When the counter 107 is coming up on 19'3", the operator releases the pressure on the switch 75 and firmly grips the knob 71 when the counter 107 indicates 19'3". In the event the counter 107 went beyond the 19'3", the operator would place the switch 77 in the reverse direction, then depress the switch 75, causing the template W to travel in a reverse direction and the counter 107 would also subtract the linear feet of template W that was reversed. The operator would then place the switch 77 in a forward position and slightly depress the switch 75 again attempting to stop the template W when the counter 107 reads 19'3" or if desired this adjustment could be made by knob 71 as previously described. Then if on the plan the architect's dimension point is placed to the left of an intersecting wall, the operator marks the template W along the right half of the template 125. More specifically, the operator places scribe marks on the template W through the aperture 131 to represent the left side of the intersecting wall and places scribe marks on the template W along the edge 137 to represent the right side of the intersecting wall. The center of the template 125 or aperture 131 is to the left of the intersection, when scribing template W, just as is the architect's dimension point. If the architect's dimension point is in the center of the intersecting wall, the operator marks the two apertures 129, 133. On the other hand, if the architect's mark is to the right of the intersection, the operator marks the left half of the template 125, or aperture 131 and the edge 135. Further use of the center template is accomplished by cutting out the space through which a through wall would occupy by stopping one wall panel at the aperture 129 and starting the next one at aperture 133. This is only in the event the architect used a dimension to the center of the stud wall. If the architect used a dimension to the left side, the first panel would be terminated at the center or aperture 131 and the next panel would begin at the edge 137; if dimensioned to the right side, the first panel should be cut at edge 135 of the center finder template 125 and the next panel would be started at the aperture 131.

Although the invention has been described and illustrated with respect to a preferred embodiment thereof, it is to be understood that it is not to be so limited since changes and modifications may be made therein which are within the full intended scope of this invention.

I claim:

1. A machine for use in scribing a template strip to be used in the frame construction of building walls and the like, said machine comprising a base including a horizontal member, means mounting a template strip having a web-like portion movably extending over said horizontal member, drive means engaging said template strip for moving said web-like portion of said template strip along said horizontal member, measuring means responsive to the movement of said template strip along said horizontal member for indicating the amount of movement thereof, center finder template means fixedly mounted from said base and extending over said web-like portion of said template strip for acting as a reference from which the amount of movement of said template strip is measured by said measuring means, a pair of indicator means movably mounted from said base on either side of said center finder template means and each having a portion extending over said web-like portion of said template strip for acting as an indicator to be used in scribing said template, and means coupled to said pair of indicator means for moving said indicator means simultaneously selectively towards and away from said center finder template to a selected position and with the distances from said center finder means to said pair of indicator means remaining the same.

2. The machine of claim 1 in which means is provided adjacent opposite ends of said web-like portion of said template strip for taking up the slack therein.

3. The machine of claim 2 in which said means for taking up slack includes a pair of spindle means rotatably mounted from said base in spaced apart relationship and upon which opposite ends of said template strip are wound, and a pair of motor means coupled respectively to said pair of spindle means for urging said template strip in opposite directions and having sufficient power to take up the slack in said template strip but insufficient power to move said template strip as a whole along said horizontal member without the aid of said drive means.

4. The machine of claim 1 in which said drive means includes a rotatably mounted platen frictionally engaging said template strip, motor means, means frictionally coupling said motor means to said platen, and knob means fixedly coupled to said platen to manually selectively stop or turn said platen independently of said motor means.

5. The machine of claim 1 in which said means coupled to said pair of indicator means includes a pair of parallel rack gear means, respectively attached to said indicator means, spur gear means between said rack gear means for selective turning movement in one direction or the other to move said rack gear means simultaneously inwardly or outwardly to carry said indicator means inwardly towards one another or outwardly away from one another.

6. The machine of claim 1 in which said center finder template is provided with an elongated aperture therethrough extending across said template strip and is provided with side edges parallel with said elongated aperture and spaced equidistant therefrom.

7. The machine of claim 6 in which each of said indicator means is provided with an elongated aperture therethrough extending across said template strip and is provided with side edges parallel with said elongated aperture and spaced equidistant therefrom.

8. The machine of claim 1 which includes pointer means mounted on one of said indicator means and locater bar means supported from said base means and having indicia means thereon for use in conjunction with said pointer means to indicate when a selected position of said indicator means has been reached.

9. A machine for use in scribing a template strip to be used in the frame construction of buildings walls and the like, said machine comprising a base including a horizontal member, a pair of spindle means rotatably mounted from said base in spaced apart relationship, a template strip having one end in a roll mounted on one of said spindle means and having the other end in another roll mounted on the other of said spindle means with a web-like portion of said template strip between said rolls movably extending over said horizontal member, a platen rotatably mounted from said base and frictionally engaging the under side of the web-like portion of said template strip, motor means, means frictionally coupling said motor means to said platen to rotatably drive said platen and move said web-like portion of said template, knob means fixedly coupled to said platen to manually selectively stop or turn said platen independently of said motor means, a pair of motor means coupled respectively to said pair of spindle means for urging said template strip in opposite directions and having sufficient power to take up the slack in said template strip but inefficient power to move said template strip as a whole along said horizontal member without the aid of said driven platen, measuring means responsive to the movement of said template strip along said horizontal member for indicating the amount of movement thereof, center finder template means fixedly mounted from said base and extending over said web-like portion of said template strip for acting as a reference from which the amount of movement of said template strip is measured by said measuring means, a pair of indicator means movably mounted from said base on either side of said center finder template means and each having a portion extending over said web-like portion of said template strip for acting as an indicator to be used in scribing said template, and means coupled to said pair of indicator means for moving said indicator means simultaneously selectively towards and away from said center finder template to a selected position and with the distances from said center finder means to said pair of indicator means remaining the same.

10. The machine of claim 9 in which said measuring means include a wheel frictionally engaging the top side of said web-like portion of said template strip over said platen, and counter means responsive to turn of said wheel to indicate the amount of said template strip that has moved past said center finder means.

References Cited

UNITED STATES PATENTS

| | | | |
|---|---|---|---|
| 1,759,992 | 5/1930 | McCarthy | 33—141 B |
| 2,522,886 | 9/1950 | Moore | 33—191 X |
| 2,549,634 | 4/1951 | Parsons | 33—76 |
| 3,169,320 | 2/1965 | Currie | 33—96 |
| 3,373,495 | 3/1968 | Grange | 33—76 |

HARRY N. HAROIAN, Primary Examiner

U.S. Cl. X.R.

33—141 B